(12) United States Patent
Rendall et al.

(10) Patent No.: US 6,447,738 B1
(45) Date of Patent: Sep. 10, 2002

(54) COPRODUCING ALUMINA, IRON OXIDE, AND TITANIUM-DIOXIDE FROM ALUMINUM ORE BODIES AND FEEDSTOCKS

(75) Inventors: John S. Rendall; Massoud Ahghar; Jerry V. Fox; Fred A. Aiken, all of Albuquerque, NM (US)

(73) Assignee: Solv-Ex Corporation, Albuquerque, NM (US)

( * ) Notice: Subject to any disclaimer, the term of this patent is extended or adjusted under 35 U.S.C. 154(b) by 41 days.

(21) Appl. No.: 09/648,300

(22) Filed: Aug. 24, 2000

(51) Int. Cl.$^7$ .............. C01F 7/00; C22B 21/00; C22B 34/00
(52) U.S. Cl. ......... 423/117; 423/132; 423/82; 423/83; 423/150.1
(58) Field of Search ............... 423/82, 83, 117, 423/132, 150.1

(56) References Cited

U.S. PATENT DOCUMENTS

| 4,244,928 A | * | 1/1981 | Ziegenbalg et al. | |
| 5,124,008 A | | 6/1992 | Rendall et al. | 204/61 |
| 5,997,828 A | | 12/1999 | Rendall | 423/132 |

OTHER PUBLICATIONS

F. A. Peters, P. W. Johnson, and R. C. Kirby, "Methods For Producing Alumina From Clay", 1963, Bureau of Mines Report of Investigations 6290, US Dept. of the Interior., No month.

\* cited by examiner

*Primary Examiner*—Steven Bos
(74) *Attorney, Agent, or Firm*—Thomas E. Schatzel; Law Offices of Thomas E. Schatzel, A Prof. Corp.

(57) ABSTRACT

A process for the extraction of alumina, iron oxide and titanium dioxide from bauxite ore and clays, and other ore bodies and feedstocks. The process starts by sulfuric acid leaching of the feedstocks in pressure autoclaves at about 200° C. and appropriate pressure. A leach liquor of sulfate salts of aluminum, iron and titanium is obtained. Any iron values are converted to a ferrous state. A recycled potassium sulfate helps produce double aluminum alkali sulfate crystals in the reduced leach liquor. The crystals are removed at about 20°–60° C. with the help of $SO_2$ gases that reduce the ferric. Such double salt is hydrolyzed into a basic aluminum alkali precipitated sulfate salt. This is then dried and calcined at about 950° C. Any alkali sulfate is washed out and recycled. The remainder is alumina. The ferrous sulfate is crystallized out at about 10° C. It is dried and calcined at about 450° C. to produce an iron oxide mixed with other sulfate salts that can be washed out and recycled.

9 Claims, 1 Drawing Sheet

Figure 1:
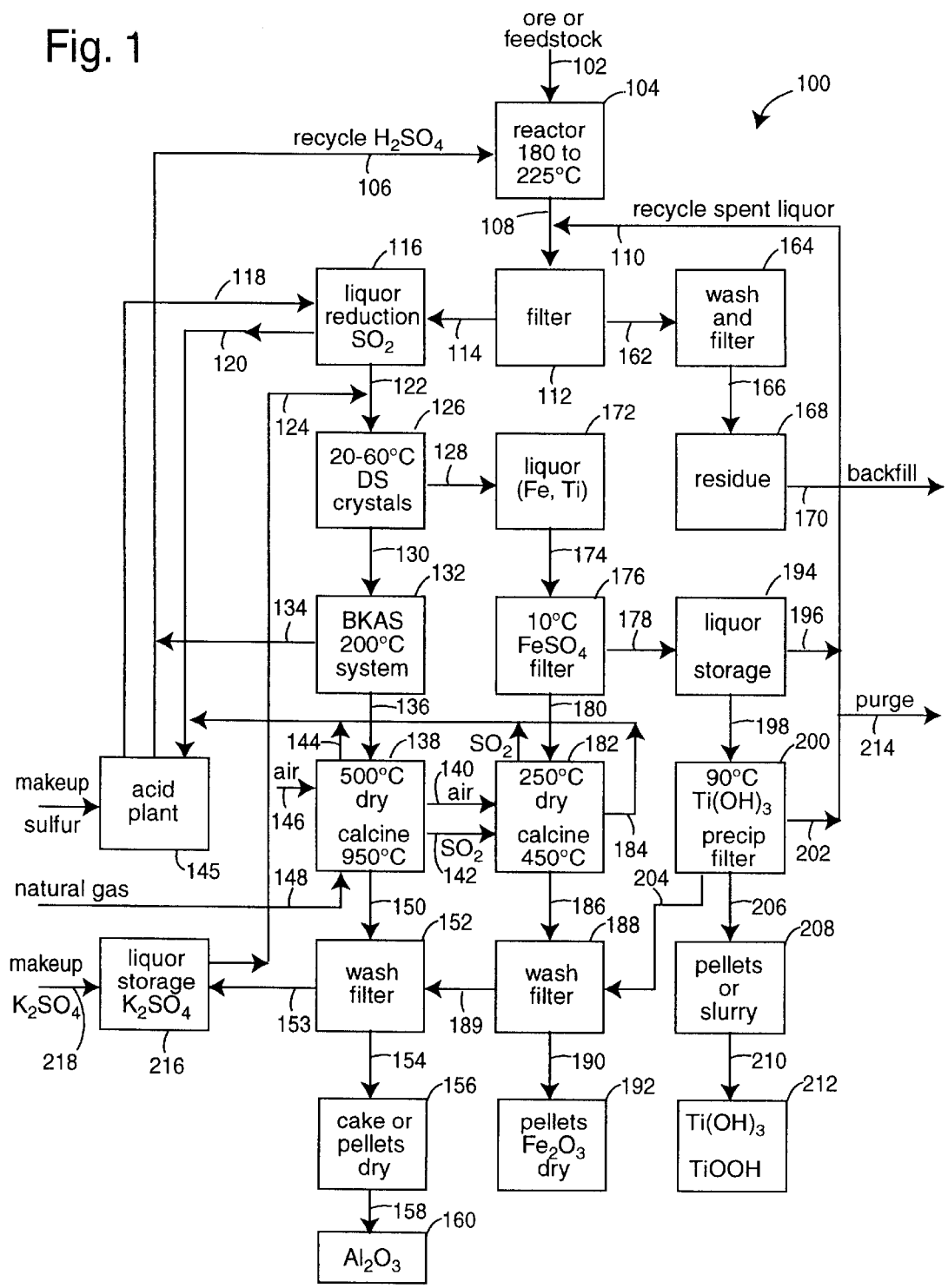

COPRODUCING ALUMINA, IRON OXIDE, AND TITANIUM-DIOXIDE FROM ALUMINUM ORE BODIES AND FEEDSTOCKS

BACKGROUND OF THE INVENTION

1. Field of the Invention

The present invention relates generally to aluminum and alumina mineral-extraction processes, and more specifically to processes which include a basic aluminum alkali sulfate as an intermediate-stage product instead of aluminum hydroxide.

2. Description of the Prior Art

Conventional methods for producing aluminum are not environmentally friendly. The aluminum industry is estimated to produce at least forty million metric tons of greenhouse-gas emissions worldwide each year. The use of so-called "inert anodes" in the production of aluminum has long been recognized as a solution to these emissions, but the high electrolysis temperatures needed, e.g., 950° C., have proven too challenging for commercial production.

The "Bayer process" is the most common, and uses a caustic as an extractant on alumina feedstock. Both U.S. Pat. Nos. 5,124,008, and 5,997,828, issued to the present inventor, John Rendall, describe methods for producing alumina from bauxite and clay ore bodies by using sulfuric acid. Both are incorporated herein by reference.

Prior art systems allow both iron and aluminum values to be in solution together within the leach liquor. The caustic in the Bayer process solubilizes some silica, and loses both the alumina and caustic in the form of aluminum silicate.

SUMMARY OF THE PRESENT INVENTION

It is therefore an object of the present invention to provide a process for the efficient extraction of alumina, iron oxide and titanium dioxide from bauxite ore and clays.

It is another object of the present invention to provide an environmentally safer system for the extraction of alumina, iron oxide and titanium dioxide from bauxite ore and clays.

Briefly, a process embodiment of the present invention is a method for the extraction of alumina, iron oxide and titanium dioxide from bauxite ore and clays, and other ore bodies and feedstocks. The process starts with a sulfuric acid leaching of the feedstocks in pressure autoclaves at 180–250° C. and appropriate pressure. A leach liquor of sulfate salts of aluminum, iron and titanium is obtained. Any iron values are converted to a ferrous state. A recycled potassium sulfate helps produce double aluminum alkali sulfate crystals in the reduced leach liquor. The crystals are removed at 20° C. to 60° C. with the help of $SO_2$ gases that reduce the ferric ions to ferrous. Such double salt is hydrolyzed into a basic aluminum alkali precipitated sulfate salt. This is then dried and calcined at about 950° C. Any alkali sulfate is washed out and recycled. The remainder is alumina. The ferrous sulfate is crystallized out at 10° C. It is dried and calcined at about 450° C. to produce an iron oxide.

Such calcination of both alumina and iron sulfates produces gases ($SO_2+SO_3$) which are recycled to an acid plant. A bleed stream from a recycled raffinate is used to remove a titanium salt by precipitation at 90° C., e.g., using seeding and steam sparging. The bleed stream from the recycled raffinate is removed when the ratio of ferrous sulfate to $TiO_2$ is about 0.8:1. A $TiO_2$ precipitate is removed, washed, and converted for use in commercial products. Another $TiO_2$ removal system raffinate bleed stream helps purge impurities that would otherwise build up. Another way to remove impurities is by evaporation drying and calcining of the metal values.

An advantage of the present invention is that a process is provided that can be used at temperatures significantly lower in electrolysis for production of aluminum and therefore reduces the challenge of inert anode use at this reduced temperature.

Another advantage of the present invention is that a process is provided that significantly improves over conventional processes by converting crystallized double salt aluminum alkali sulfate into a precipitated basic double salt. It recycles about sixty to seventy percent of the water, sulfuric acid and alkali sulfate.

A still further advantage of the present invention is that a process is provided that produces iron oxide and titanium values available as hydroxides.

Another advantage of the present invention is that a process is provided that effectively overcomes conventional problems by using potassium or other alkali sulfate carriers in double salt crystallization and recycling such carriers. The benefits are the coproduction of ferrous sulfate or iron oxide for making steel. The alumina yield also increases, because silica does not affect the reaction.

These and other objects and advantages of the present invention will no doubt become obvious to those of ordinary skill in the art after having read the following detailed description of the preferred embodiment as illustrated in the drawing figure.

IN THE DRAWINGS

FIG. 1 is a functional block diagram of a processing plant embodiment of the present invention that implements a process for the extraction of alumina, iron oxide and titanium dioxide from bauxite ore and clays.

DETAILED DESCRIPTION OF THE PREFERRED EMBODIMENT

A processing plant embodiment of the present invention is diagrammed in FIG. 1, and is referred to herein by the general reference numeral 100. Such process plant 100 uses sulfuric acid to extract alumina from a feedstock 102, or other ore bodies of aluminum. In actual practice, the usual ore bodies include iron and titanium in various mineral compositions. These later convert to leach-liquor sulfate values.

The process plant 100 includes a reactor 104 that receives the feedstock 102, a sulfuric acid recycle 106, and a spent-liquor recycle 110. The reactor is used to leach out the metals of interest. A leached-slurry output 108 is sent along with recycle 110 to a solids separator 112 that filters and outputs a liquid leach-liquor flow 114. A reducer 116 receives a sulfur dioxide ($SO_2$) supply 118 and returns sulfur trioxide ($SO_3$) 120. An output 122 is mixed with a recycle 124 and applied to a crystallizer 126. An iron and titanium flow 128 is withdrawn. A crystallized output 130 is sent to a basic potassium aluminum sulfate (BKAS) system 132 that separates out an acid flow 134. A remainder 136 is forwarded to a dryer 138. An air flow 140 and a sulfur dioxide flow 142 are produced. A sulfur gas ($SO_2+SO_3$) stream 144 is returned to an acid plant 145. An air input 146 and a natural gas supply 148 are used for drying. The dryer 138 also calcinates a product 150 that is then separated by a filter/washer 152 with a recycle output flow 153. A solids output 154 flows to a pelletizer 156 that outputs a product flow 158 comprising a commercial product alumina 160.

The filter 112 outputs a solids flow 162 that is received by a secondary washer and filter 164. An output 166 is received by a residue processor 168 and a backfill material 170 is discharged.

The iron and titanium flow 128 feeds a liquor 172 and a flow 174 is sent to a filter 176 where it is cooled to 10° C. before separating $FeSO_4$. A raffinate 178 is removed. Filtered solids 180 are sent to a dryer 182. A sulfur oxides output 184 is returned to the acid plant 145. After calcination, the dryer 182 sends a flow 186 to a wash filter 188 with a recycle output flow 189. A washed product flow 190 is sent into a pelletizer and a dryer 192.

The raffinate 178 is sent to a liquor storage 194. A spent-liquor flow 196 is contributed to the spent-liquor recycle 110. A bleed-stream 198 flows to a precipitation and filter 200. A second spent-liquor flow 202 is also contributed to the spent-liquor recycle 110. A bleed-stream 204 is sent to the wash filter 188, and a second titanyl hydroxide flow 206 is sent to a pellet or slurry preparation 208. A flow 210 is output into a titanium product 212.

A purge flow 214 is drawn off the spent-liquor recycle 110 as needed. A potassium sulfate storage 216 receives a makeup 218 and helps balance the flows in and out of the recycle 124.

The raw material ore or feedstock 102 generally includes aluminum values which naturally coexist with iron and titanium values. Such ore is crushed or sized to not exceed quarter-inch particles and is fed to the pressure autoclave system, e.g., reactor 104. To this are added the recycle sulfuric acid 106 from the acid plant 145, and the recycle system of acid and potassium sulfate 134 from the basic potassium aluminum sulfate (BKAS) system 132.

The autoclave system 104 is maintained at a temperature of preferably between 180–250° C. and appropriate pressure. The residence time of the slurry in the autoclave system is preferably fifteen to sixty minutes, depending on the source and nature of the feedstock. The leach liquor of aluminum, iron, titanium values is mixed with the recycle spent liquor 110 so as to keep all the metal salt values in solution even at reduced temperatures. This slurry then feeds the filter 112 to separate the leach liquor from residue.

The pressure filters used are preferably commercial units that operate as presses, candle, or rotary systems. A clean leach liquor is reduced in temperature by evaporation of water after depressurization and vacuum cooling to about 80–90° C. in reactor 104 in output 108. The wash filter 112 can alternatively include a neutralization wash step, depending on local laws applicable to the discharge backfill 170. In reducer 116, the liquor temperature after being lowered to 80–90° C. by evaporation is chemically reduced by ozone, or preferably $SO_2$. The $SO_2$ is fed from the acid plant 145 and any off gases are returned to recover the $SO_2$ values.

Method embodiments of the present invention ensure that all the ferric sulfate is reduced to its ferrous form. A resulting greater solubility helps double salts of potassium (alkali) aluminum sulfate to crystallize out without co-crystallization with ferrous sulfate. This reduced leach liquor is fed to the vacuum crystallizer 126 which produces double salt $KAl(SO_4)_2$ crystals. The potassium (alkali) sulfate recycle 124 is controlled to result in a slight stoichiometric excess of potassium sulfate in the leach liquor fed 122.

Crystallization starts with some fine-particle seeding, and can reach a ninety percent yield. The double salts are preferably washed by centrifuges and sent to BKAS system 132 to precipitate a basic double salt of potassium aluminum sulfate. Such operates at temperatures of 180–250° C. and appropriate pressure and preferably maintained at 200° C. The water and potassium sulfate are reduced by about sixty to seventy percent, compared to the double salt crystals, and acid (sulfuric) is correspondingly decreased about fifty percent.

The precipitate can be filtered out using belt, leaf, candle or other kinds of commercial pressure filters. The filtrate cake is washed and a cake is sent to dryer 138. Any liquid separated from the cake will include liberated water, potassium sulfate, and sulfuric acid. Such are fed back in flow 153 to join the recycle sulfuric acid ($H_2SO_4$) 124 for feedstock leaching.

The BKAS cake is dried in the dryer 138 at about 500° C., and most of the waters of hydration in the precipitate are removed. Hot air is used in rotary drum dryers or fluid flash systems to do the drying. The dried BKAS is then calcined at 950° C. in rotary-drum calciners or fluid-flash systems.

The calcined material 150 includes alumina ($Al_2O_3$) and the potassium, or other alkali, sulfate. This is cooled, washed, and filtered in wash filter 152. A cake or pellets are formed using polymer binders and then dried. Any potassium sulfate washed out of filter 152 is fed in flow 153 into the liquor storage tank 216. From there, it can be recycled in flow 124 to mix with a double salt of aluminum potassium sulfate for crystallizer 126.

An aluminum-potassium depleted liquor is removed from crystallizer 126 into storage 172. From there, it can be fed to 176 for cooling to 10° C. using refrigeration. A ferrous sulfate ($FeSO_4$) is crystallized out and filtered. The raffinate 178 flows to liquor storage 194. In dryer 182, the ferrous sulfate crystals are dried. Most of the waters of crystallization are removed. A first stage operates at 250° C., and a calcination stage operating at 450° C. removes $SO_2$ and $SO_3$ gases.

The dryer 182 can be similar to that used for dryer 138, and it could be advantageous to use the exit air and gas streams from dryer 138 as they are already at the temperatures required for dryer 182. Any iron oxide is washed free of the aluminum and potassium salts in filter 188 and exit in flow 190. The aluminum and potassium salts are recycled via flows 189 and 153, and liquor storage 216. The washed iron oxide is dried "as is", or in pellet form, in dryer 192 using fluid or rotary drum dryers for easy storage and transportation.

The raffinate 178 stored in storage 194 is recycled in flow 196 to mix with the leached slurry from reactor system 104. The recycle is turned off when the ratio of the ferrous sulfate to $TiO_2$ reaches about 0.8:1. If the ratio is higher, the bleed stream 198 is used to remove excess ferrous sulfate. E.g., at a rate to remove the amount of $TiO_2$ entering the system at reducer 116. Precipitation filter 200 heats the bleed stream 204 to about 90° C. The stream is sprinkled (sparged) with fine seed-crystals of $TiO_2$. This precipitates titanyl hydroxide which can be removed by washing and filtering. The cake product is stored in pellet form, or as a slurry, to provide a commercial feedstock for $TiO_2$ producers. Such product is often used in the pigment industry. The bleed stream 204 is removed from returning raffinate from filter 200 to evaporate or dispose of via filter 164 and 168.

The process plant 100 adds sulfuric acid to its recycle acid streams to leach-out aluminum, iron, titanium and other metal sulfates. Autoclaves and filters are used to create and hold-in an intermediate leach liquor. Such liquor helps in the removal of aluminum sulfate as a double salt with a recycle alkali sulfate from the crystallizer 126.

A basic double salt liquor 172 is produced that has sixty to seventy percent of the water, an alkali sulfate, and about half the acid of the original crystallized double salt. A precipitated basic double salt of aluminum and alkali sulfate 174 is obtained by hydrolysis. The filter 176 filters out and washes this. The dryer 182 produces alumina. The alkali sulfate is washed clear of the alumina and recycled as water soluble alkali sulfate salt. The filtered alumina is washed and dried as pellets, or other suitable forms, with or without the use of a binding agent.

The leach liquor after being depleted of aluminum values is further cooled to produce crystals of ferrous sulfate. Leach liquor at every stage is reduced by a reducing agent, preferably $SO_2$, to ensure the iron salt in solution is ferrous sulfate. The ferrous sulfate crystals are washed, dried and marketed as such. Alternatively, they are calcined to produce iron oxide. The sulfates of aluminum and alkali are washed out and recycled. The iron oxide is dried in pellet form for commercial sale.

The leach liquor depleted of most of the aluminum and iron values is recycled until the build up of the titanium values reaches a ratio of ferrous sulfate $FeSO_4$ to $TiO_2$ that is less than 0.8:1. A bleed stream containing the titanium values leached from ore is withdrawn at the rate it enters the system. The bleed stream is then heated to about the boiling point of water, and steam sparged with seed crystals of $TiO_2$ which dictate the nature and particle size of the hydrolyzed product of titanyl hydroxide from which titanium dioxide can be commercially produced. The inert residue is neutralized and washed for backfill using a suitable alkali, e.g., lime or caustic.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A process for extracting alumina and other metal values from feedstocks and ore bodies, comprising:

removing a leach liquor of metal sulfates and sulfuric acid after cooking at about 200° C. in a pressure autoclave;

reducing any ferric values in said leach liquor with $SO_2$ to produce a ferrous sulfate which remains in said leach liquor;

removing potassium by crystallizing any double salt values of aluminum alkali sulfate in said leach liquor at about 20° C.–60° C.;

washing said double salt free from said leach liquor;

hydrolyzing said double salt at about 180° C.–250° C. to form a basic double salt of aluminum potassium sulfate;

removing, washing, drying and calcinating the basic double salt of aluminum potassium sulfate to produce an alumina and a potassium sulfate;

washing said alumina and recycling said potassium sulfate; and drying said alumina washed free of potassium sulfate.

2. The process of claim 1, wherein:

the step of removing, washing, drying and calcinating first removes any water at about 500° C., and second removes any $SO_2/SO_3$ at about 950° C.

3. The process of claim 1, further comprising the steps of:

removing any remaining iron values in said leach liquor at about 10° C. as ferrous sulfate crystals;

drying said ferrous sulfate crystals at 250° C.;

calcinating at about 450° C. to remove any $SO_2/SO_3$ for recycle via an acid plant; and washing a calcined iron oxide to remove any aluminum/potassium sulfate.

4. The process of claim 3, wherein:

the step of removing any remaining iron values includes recycling said leach liquor after iron withdrawal to increase any $TiO_2$ values until a ratio of ferrous sulfate to $TiO_2$ in said leach liquor is about 0.8:1, and removing a bleed stream at a rate that maintains a balance in the process; and heating said leach liquor to about 90° C., sparging with steam and seeding to produce a precipitate of titanyl hydroxide.

5. A method for coproducing alumina, titanium dioxide, and iron oxide from natural feedstock ores, the method comprising the steps of:

leaching aluminum, titanium, and iron values from a natural feedstock ore with sulfuric acid to produce a leach liquor;

mixing said leach liquor with an alkali sulfate;

hydrolyzing to precipitate a basic double salt of aluminum alkali sulfate;

drying the precipitate of basic double salt of aluminum alkali sulfate to produce an alumina;

washing said alkali sulfate clear of any said alumina and recycling as water-soluble alkali sulfate salt;

further cooling said leach liquor after depleting any aluminum values to produce crystals of ferrous sulfate; and reducing said leach liquor with $SO_2$ to ensure any iron salt in solution is ferrous sulfate;

wherein, said alumina and said ferrous sulfate are independently removed.

6. The method of claim 5, further comprising the steps of:

washing and drying said ferrous sulfate as crystals.

7. The method of claim 5, further comprising the steps of:

calcinating said ferrous sulfate as crystals to produce iron oxide.

8. The method of claim 5, further comprising the steps of:

washing out and recycling sulfates of aluminum and alkali.

9. The method of claim 5, further comprising the steps of:

withdrawing a bleed stream containing titanium values leached from ore;

heating said bleed stream to about the boiling point of water; and steam sparging with seed crystals of $TiO_2$;

wherein, said seed crystals of $TiO_2$ dictate a nature and particle size of a hydrolyzed product of titanyl hydroxide from which titanium dioxide is produced.

* * * * *